(12) United States Patent
Marri et al.

(10) Patent No.: US 11,401,475 B2
(45) Date of Patent: Aug. 2, 2022

(54) PRODUCTION OF LIGHT OLEFINS FROM CRUDE OIL VIA FLUID CATALYTIC CRACKING PROCESS AND APPARATUS

(71) Applicant: LUMMUS TECHNOLOGY LLC, Bloomfield, NJ (US)

(72) Inventors: Rama Rao Marri, Katy, TX (US); Justin Breckenridge, Bloomfield, NJ (US); Liang Chen, Bloomfield, NJ (US); Manoj Som, Bloomfield, NJ (US)

(73) Assignee: LUMMUS TECHNOLOGY LLC, Bloomfield, NJ (US)

( * ) Notice: Subject to any disclaimer, the term of this patent is extended or adjusted under 35 U.S.C. 154(b) by 0 days.

(21) Appl. No.: 17/199,735

(22) Filed: Mar. 12, 2021

(65) Prior Publication Data
US 2021/0284921 A1   Sep. 16, 2021

Related U.S. Application Data
(60) Provisional application No. 62/989,507, filed on Mar. 13, 2020.

(51) Int. Cl.
*C10G 55/08* (2006.01)
*C10G 11/18* (2006.01)
(Continued)

(52) U.S. Cl.
CPC .............. *C10G 55/08* (2013.01); *B01J 8/008* (2013.01); *B01J 8/0055* (2013.01); *B01J 8/26* (2013.01);
(Continued)

(58) Field of Classification Search
CPC ............ C10G 61/02; C10G 2300/1044; C10G 2300/4006; C10G 2300/70; B01J 8/1827;
(Continued)

(56) References Cited

U.S. PATENT DOCUMENTS

| 4,875,994 A | 10/1989 | Haddad et al. |
|---|---|---|
| 4,895,636 A | 1/1990 | Chen et al. |

(Continued)

FOREIGN PATENT DOCUMENTS

| CN | 109722283 A | 5/2019 |
|---|---|---|
| CN | 110540869 A | 12/2019 |

OTHER PUBLICATIONS

International Search Report issued in International Application No. PCT/US2021/022063 dated Jul. 5, 2021 (5 pages).

(Continued)

*Primary Examiner* — Randy Boyer
*Assistant Examiner* — Juan C Valencia
(74) *Attorney, Agent, or Firm* — Osha Bergman Watanabe & Burton LLP

(57) ABSTRACT

A reactor system configured for efficiently removing contaminants (CCR, nickel, vanadium, nitrogen, sodium, iron, calcium, chlorine etc.) from a heavy portion of the crude oil. The products are routed to a common main fractionation section. The heavy feed with lower contaminants may then be processed in a fluid catalytic cracking (FCC) unit, the overall concept employing a fluid catalytic reaction platform with carbon rejection approach. Also disclosed is a reactor system for efficiently processing crude oil in a fluid catalytic cracking unit with a dual-reactor and dual catalyst system to maximize petrochemical building blocks such as ethylene, propylene, butylenes, BTX (benzene, toluene and xylene) rich naphtha from a variety of crude oils.

26 Claims, 3 Drawing Sheets

(51) Int. Cl.
*C10G 7/00* (2006.01)
*C10G 25/12* (2006.01)
*B01J 8/26* (2006.01)
*B01J 8/00* (2006.01)

(52) U.S. Cl.
CPC .............. *C10G 7/00* (2013.01); *C10G 11/182* (2013.01); *C10G 25/12* (2013.01); *B01J 2208/00805* (2013.01); *B01J 2208/00991* (2013.01); *C10G 2300/4081* (2013.01); *C10G 2300/701* (2013.01); *C10G 2400/20* (2013.01); *C10G 2400/30* (2013.01)

(58) Field of Classification Search
CPC .. B01J 8/1845; B01J 8/26; B01J 2208/00752; B01J 2208/00761; B01J 2208/0084; B01J 2208/00938; B01J 8/0025; B01J 8/0055; B01J 8/0095; B01J 8/087; B01J 8/18; B01J 8/1818; B01J 8/1863; B03B 5/32; B01D 45/02

See application file for complete search history.

(56) References Cited

U.S. PATENT DOCUMENTS

| | | | |
|---|---|---|---|
| 7,632,977 B2 * | 12/2009 | Mo | C10G 11/18 585/648 |
| 2003/0211017 A1 | 11/2003 | Pankaj et al. | |
| 2014/0014555 A1 | 1/2014 | Marri et al. | |
| 2018/0079973 A1 * | 3/2018 | Chen | C10G 51/026 |
| 2018/0346827 A1 * | 12/2018 | Al-Ghamdi | B01J 8/1809 |

OTHER PUBLICATIONS

Written Opinion issued in International Application No. PCT/US2021/022063 dated Jul. 5, 2021 (5 pages).

* cited by examiner

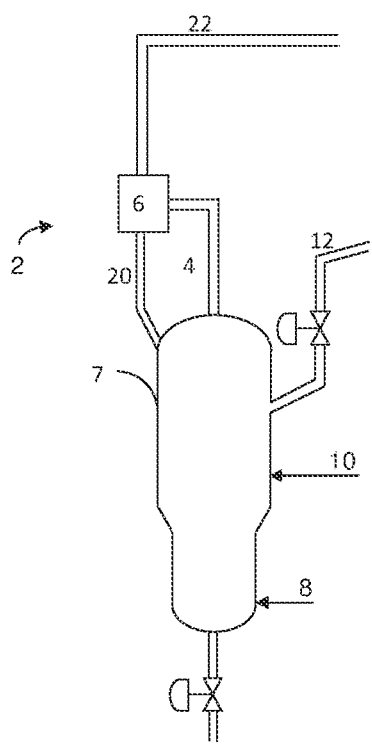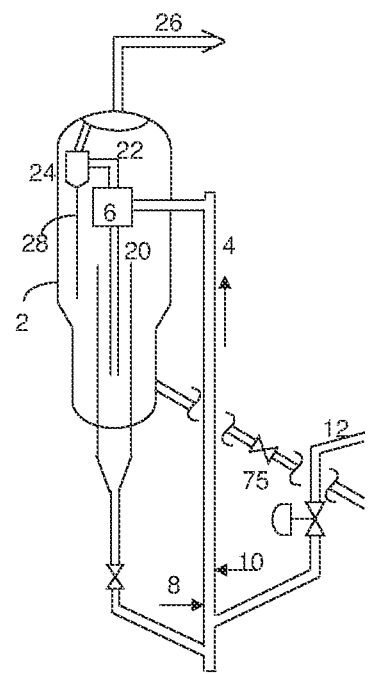
Figure 1A
Figure 1B

PRODUCTION OF LIGHT OLEFINS FROM CRUDE OIL VIA FLUID CATALYTIC CRACKING PROCESS AND APPARATUS

BACKGROUND

When the end boiling point of the hydrocarbon mixture is high, such as over 550° C., the hydrocarbon mixture typically cannot be processed directly. The presence of these heavy hydrocarbons may result in the formation of coke in reactors, where such coking may occur rapidly. Whole crudes typically also contain impurities, such as Conradson Carbon, metals, and others that make direct processing of the whole crude more difficult.

Further, emergence of tight oil and shale oil offer abundant oil resources. However, it poses significant processing challenges due to the difference in oil properties and chemical compositions. Specifically, in order to process tight/shale oil using FCC technology in a refinery, one big challenge is the high levels of unconventional metals, such as iron and calcium, as compared to processing conventional crude oil.

High levels of iron, calcium and other metals, for example, may result in deposition of iron and calcium on the catalyst surface. The deposited iron and calcium may form a thick layer of metal shell on the catalyst, causing a loss of diffusivity of oil vapor. This results in a loss of conversion and an increase in coke and heavy oil products. A high level of iron and calcium deposition on catalysts may change the catalyst properties, affecting catalyst circulation and leading to processing and performance issues.

In order to minimize the effect of these unconventional metals, especially at higher contaminant levels found in tight/shale oil, refiners usually must significantly increase their daily catalyst addition to mitigate metal deposition on catalyst and facilitate catalyst circulation. This, however, leads to a dramatic increase in operation cost.

BRIEF SUMMARY

Embodiments herein are directed toward a reactor system configured for efficiently removing contaminants (CCR, nickel, vanadium, nitrogen, sodium, iron, calcium, etc.) from a heavy portion of the crude oil. The products are routed to a common main fractionation section. The heavy feed with lower contaminants may then be processed in a fluid catalytic cracking (FCC) unit, the overall concept employing a fluid catalytic reaction platform with carbon rejection approach.

In one aspect, embodiments herein are directed toward a system useful for catalytic cracking of a whole crude. The system may include a separator for separating a whole crude into a light boiling fraction and a heavy boiling fraction. The system may also include a regenerator provided for regenerating spent first catalyst and spent second catalyst. The regenerator may include, in various embodiments, a first outlet for conveying a mixture of regenerated first and second catalyst, and a second outlet for conveying a mixture of regenerated first and second catalyst. A riser reactor may be configured to receive a mixture of regenerated catalyst, and may be used for contacting the heavy boiling fraction with the catalyst mixture to convert hydrocarbons in the heavy boiling fraction to lighter hydrocarbons. The catalyst mixture may include a first catalyst and a second catalyst, and the first catalyst may have a density greater than a density of the second catalyst, a particle size larger than a particle size of the second catalyst, or both a greater density and a larger particle size than the second catalyst. The riser reactor may include an inlet for receiving the catalyst mixture comprising regenerated first and second catalyst from the regenerator, as well as an outlet for conveying a mixture of converted hydrocarbons and the catalyst mixture.

The system may also include a second reactor for contacting the light boiling fraction with a concentrated catalyst mixture, including first catalyst and second catalyst, where the concentration of first catalyst may be elevated as compared to the mixture received from the catalyst regenerator. The second reactor may include an inlet for receiving the catalyst mixture including regenerated first and second catalyst from the regenerator, as well as an outlet for conveying a mixture of converted hydrocarbons, first catalyst and second catalyst to a catalyst separation system.

The catalyst separation system may be configured to separate the first catalyst from a mixture comprising the second catalyst and the converted hydrocarbons based on at least one of catalyst size or catalyst density, thereby producing a first stream comprising separated first catalyst and a second stream comprising the second catalyst and the converted hydrocarbons. The catalyst separation system may feed an inlet of the second reactor for receiving the first stream comprising the separated first catalyst, thereby increasing a concentration of the first catalyst in the second reactor.

One or more disengagement vessels may be provided for separating catalysts from converted hydrocarbons. The disengagement vessels may include one or more inlets for receiving (i) the second stream comprising the second catalyst and the converted hydrocarbons and/or (ii) the mixture of converted hydrocarbons and the catalyst mixture. The disengagement vessels may be configured to separate and recover a first effluent comprising converted hydrocarbons and a second effluent comprising a mixture of spent first and second catalyst. A flow line for conveying the mixture of spent first and second catalyst from the disengagement vessel(s) to the regenerator may also be provided.

In another aspect, embodiments herein are directed toward processes for catalytic cracking of a whole crude. The processes may include separating a whole crude into a light boiling fraction and a heavy boiling fraction. The heavy boiling fraction may then be converted in a first two-reactor dual-catalyst system, producing a converted hydrocarbon effluent. The light boiling fraction may be converted in a second two-reactor dual-catalyst system, producing a converted hydrocarbon effluent.

The converted hydrocarbon effluents from each of the first two-reactor dual catalyst system and the second two-reactor dual catalyst system may then be separated in a common fractionation system configured to separate the converted hydrocarbon fractions into two, three, or more hydrocarbon fractions. The hydrocarbon fractions may include, for example, one or more olefin containing fractions and a treated fluid catalytic cracking feedstock.

Converting the heavy boiling fraction in the first two-reactor dual-catalyst system may include contacting the heavy boiling fraction with a residue fluid catalytic cracking catalyst and contacting contaminated residue fluid catalytic cracking catalyst with a metal trap. Converting the light boiling fraction in the second two-reactor dual-catalyst system may include contacting the treated fluid catalytic cracking feedstock with a mixed catalyst system comprising a first catalyst and a second catalyst in a first reactor, and contacting the light boiling fraction with a mixed catalyst system comprising the first catalyst and the second catalyst in a second reactor. In the second reactor, the first catalyst may be at a higher relative concentration compared to the first reactor and/or as received from the catalyst regenerator. Following conversion, an effluent from each of the first and second reactors may be separated into a spent catalyst mixture and a converted hydrocarbon effluent. The converted hydrocarbon effluents from the first and second two-reactor dual-catalyst system are then fed to the common fractionation system.

In yet another aspect, embodiments herein are directed toward a system useful for catalytic cracking of a whole crude. The system may include a separator for separating a whole crude into a light boiling fraction and a heavy boiling fraction. The system may also include a first two-reactor dual-catalyst system and a second two-reactor dual-catalyst system, each producing a converted hydrocarbon effluent. A common fractionation system may receive the converted hydrocarbon effluent from each of the first two-reactor dual catalyst system and the second two-reactor dual catalyst system, the common fractionation system being configured to separate the converted hydrocarbon fractions into two or more hydrocarbon fractions including one or more olefin containing fractions and a treated fluid catalytic cracking feedstock.

The first two-reactor dual-catalyst system may be configured for contacting the heavy boiling fraction with a residue fluid catalytic cracking catalyst and for contacting contaminated residue fluid catalytic cracking catalyst with a metal trap.

The second two-reactor dual-catalyst system may include a first reactor for contacting the treated fluid catalytic cracking feedstock with a mixed catalyst system comprising a first catalyst and a second catalyst. The second two-reactor dual-catalyst system may also include a second reactor for contacting the light boiling fraction with a mixed catalyst system comprising the first catalyst and the second catalyst. As with other embodiments herein, the first catalyst may be at a higher relative concentration in the second reactor compared to the first reactor or as received from the regenerator.

The system may also include a catalyst disengagement vessel configured to receive and separate an effluent from each of the first and second reactors into a spent catalyst mixture and the converted hydrocarbon effluent from the second two-reactor dual catalyst system fed to the common fractionation system.

Other aspects and advantages will be apparent from the following description and the appended claims.

BRIEF DESCRIPTION OF THE DRAWINGS

FIGS. 1A and 1B are simplified flow diagrams of a catalyst concentrating system useful in embodiments herein.

DETAILED DESCRIPTION

Figure 2:
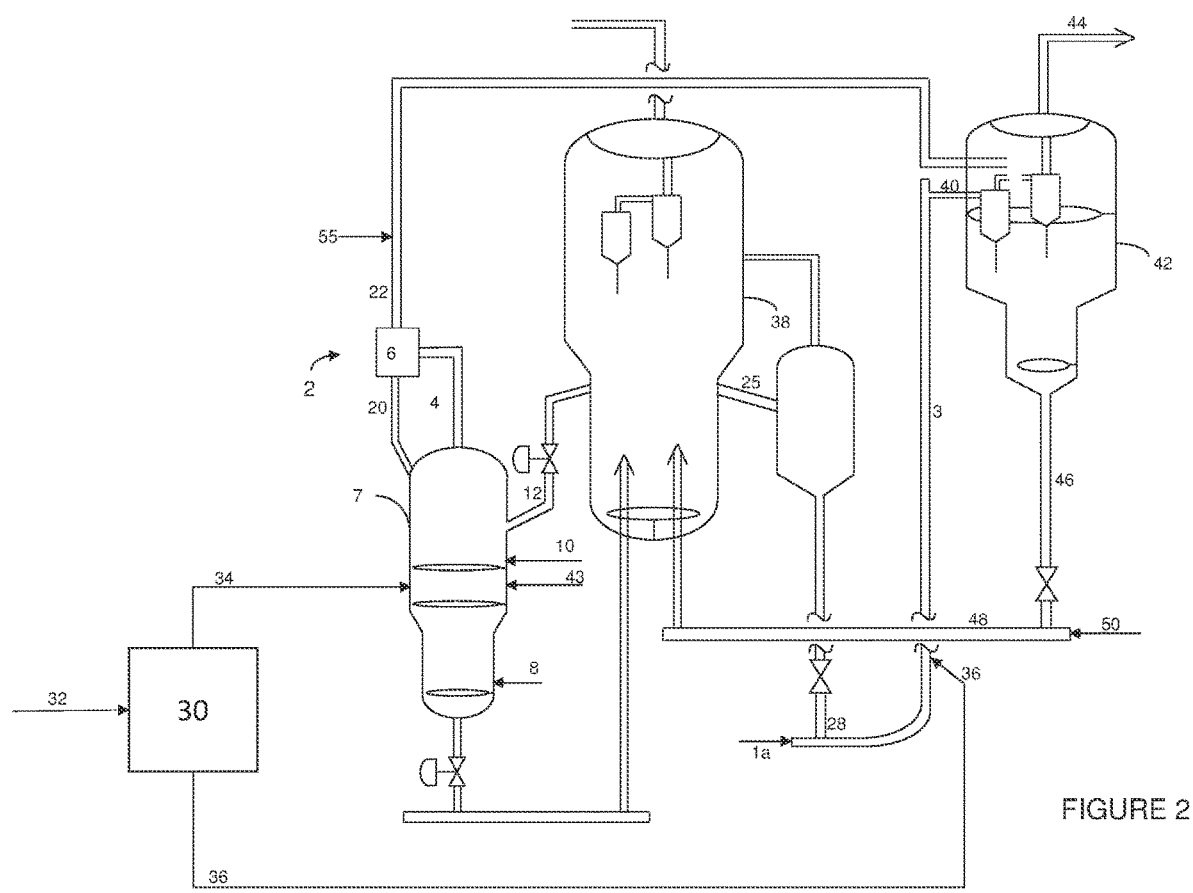
FIG. 2 is a simplified flow diagram of a process for conversion of a whole crude according to embodiments herein.

As used herein, the terms "catalyst" and "particle" and like terms may be used interchangeably. Summarized above, and as further described below, embodiments herein separate mixed particulate materials based on size and/or density to achieve an advantageous effect in the whole crude conversion systems. The particles or particulate materials used to facilitate reaction may include catalysts, absorbents, and/or heat transfer materials having no catalytic activity, for example.

Embodiments herein generally relate to systems and processes for enhancing the processability of whole crudes and other wide boiling range hydrocarbon mixtures. More specifically, embodiments herein relate to productivity and/or flexibility of processing whole crudes and other wide boiling range hydrocarbon mixtures via fluid catalytic cracking using mixed catalyst systems and/or mixed catalysts/adsorbent systems. Processes and apparatus disclosed herein may be beneficial to the overall conversion of whole crudes and other wide boiling range hydrocarbon mixtures into a very high yield of light olefins, such as propylene and ethylene, and aromatics, as well as gasoline with high octane number and/or diesel in some embodiments.

Embodiments herein include reaction systems or conditioning systems that may include a common regenerator. The common regenerator may be used to regenerate a mixture of particles, which may include, for example, a mixture of two or more catalysts, a mixture of a catalyst and a contaminant trapping additive, a mixture of two or more catalysts with a contaminant trapping additive, a mixture of a contaminant trapping additive and a heat transfer particle, and other possible combinations of catalysts, contaminant trapping additives, and/or inert particles.

Embodiments herein may also include catalyst concentrating systems or vessels, and/or contaminant trapping additive concentrating systems or vessels. As a mixture of particles may be provided from the common regenerator, catalyst/trapping additive concentrating systems may be provided to enhance a concentration of a desired catalyst or trapping additive for use in a reactor or treater. In some embodiments, a catalyst or trapping additive may be concentrated to a level three to four times greater than as received from the regenerator. The concentrated catalyst or additive may then provide a more favorable conversion or treatment as compared to the mixed particle system.

Concentration of a catalyst may be performed, for example, in a separation system 2 as illustrated in FIGS. 1A and 1B, where like numerals represent like parts. A mixture including vapors and catalyst may be fed via flow line 4 to a solids separation device 6. As illustrated in FIG. 1A, flow line 4 may be an effluent line from a moving or fluidized bed reactor 7 conveying converted hydrocarbons and a mixture of catalyst particles in some embodiments, or from a moving/fluidized bed contaminant removal vessel 7. In other embodiments, such as illustrated in FIG. 1B, flow line 4 may be a riser reactor for contacting one or more hydrocarbon feedstocks 8, 10 with a mixture of catalysts received via flow line 12, such as from a catalyst regenerator (not illustrated). The mixture of vapors and catalyst may include, for example, converted hydrocarbons, a first catalyst and a second catalyst, such as may be received from a riser reactor or moving bed reactor for catalytically converting hydrocarbons. In other embodiments, the mixture fed to solids separator 6 may include, for example, a mixture of a lifting gas, a catalyst, and a metal trap, such as may be received from a contaminant removal vessel 7.

The particles in the mixture fed to solids separation device 6 may include a first particle type (such as a first catalyst employed for residue cracking or a metal trap) and a second particle type (such as a second catalyst), where the first particle type may have at least one of a larger diameter or a higher density than the second particle type. In the solids separation device 6, the vapors and mixed particles may be separated, recovering a solids stream 20, including the larger and/or denser first particle type, and a mixed effluent stream 22 including the lifting gas/converted hydrocarbons and the second particle type.

In some embodiments, such as illustrated in FIG. 1A, the effluent 22 may be forwarded to a downstream unit (not illustrated). For example, effluent 22 may be fed to a disengagement vessel (not illustrated) for separation of the second catalyst from hydrocarbon vapors. As another example, effluent 22 may be fed to a catalyst regenerator (not illustrated) for separating lifting gas from the catalyst. The particles recovered via flow line 20 may then be returned to the reactor 7, thereby concentrating the particles (metal trap or first catalyst) within the reactor 7.

In other embodiments, such as illustrated in FIG. 1B, the effluent 22 may be fed to a separator, such as a cyclone separator 24, for separating the effluent vapor, recovered via flow line 26, from the catalyst, recovered via flow line 28. The particles recovered via flow line 28 may then be returned to a catalyst regenerator (not shown), and the particles recovered via flow line 20 may be returned to riser reactor 4, thereby concentrating the second catalyst in the riser reactor 4.

In some embodiments, a system useful for catalytic cracking of a whole crude may include a single regenerator dual-reactor system, also referred to herein as a two-reactor dual-catalyst system. The system may include at least two reactors, such as a moving or fluidized bed reactor and a riser reactor, multiple riser reactors, or multiple moving or fluidized bed reactors for processing the whole crude. Each reactor vessel may receive catalysts from a single regenerator.

Referring now to FIG. 2, a reactor system for processing a whole crude is illustrated, where like numerals represent like parts. The system may include a separator 30 for separating a whole crude 32, such as a desalted whole crude into a light boiling fraction 34 and a heavy boiling fraction 36. In some embodiments, separating a whole crude into a light boiling fraction and a heavy boiling fraction may include separating a light boiling fraction having a 95% end boiling temperature in the range from about 300° C. to about 420° C. from the heavy boiling fraction. The actual cut point for the separations, however, may be based on the particular crude being processed.

The system may also include a regenerator 38 for regenerating spent first catalyst and spent second catalyst. The catalyst mixture may include a first catalyst and a second catalyst, where the first catalyst has a density greater than a density of the second catalyst, a particle size larger than a particle size of the second catalyst, or both a greater density and a larger particle size than the second catalyst.

The regenerator 38 may include a first outlet 12 for conveying a mixture of regenerated first and second catalyst and a second outlet 25, also for conveying a mixture of regenerated first and second catalyst from the regenerator. Outlet 25 may feed catalyst to an inlet 28 of a riser reactor 3, where the catalyst mixture fed to the riser reactor may include a mixture of first and second catalyst from the regenerator. A fluidizing gas 1a may be used to convey the catalyst into reactor 3, for example. In riser reactor 3, the heavy boiling fraction 36 may be contacted with the catalyst mixture, converting hydrocarbons in the heavy boiling fraction to lighter hydrocarbons. An outlet from the riser reactor may then convey the reactor effluent 40, a mixture of converted hydrocarbons and the catalyst mixture, to a disengagement vessel 42.

Outlet 12 may feed the regenerated first and second catalyst to a second reactor 7 for contacting the light boiling fraction 34 with a concentrated catalyst mixture comprising first catalyst and second catalyst. As described above with respect to FIGS. 1A and 1B, the first catalyst may be concentrated in second reactor 7 via catalyst concentrating separation system 2 using the catalyst/solid separation system 6. The second reactor may include an inlet for receiving the catalyst mixture, including regenerated first and second catalyst, from the regenerator. As described with respect to FIG. 1A, the second reactor may also include an outlet 4 for conveying a mixture of converted hydrocarbons, first catalyst and second catalyst to a catalyst/solid separation system 6, where the catalyst separation system may separate the first catalyst from a mixture comprising the second catalyst and the converted hydrocarbons based on at least one of catalyst size or catalyst density. A first stream 20 comprising separated first catalyst and a second stream 22 comprising the second catalyst and the converted hydrocarbons may be recovered from the catalyst separation system 6. The first catalyst stream 20 may then be fed to an inlet of the reactor 7, thereby increasing a concentration of the first catalyst in the second reactor.

The effluents from the riser reactor 3 and the second reactor 7 may both be fed to disengagement vessel 42. Accordingly, disengagement vessel 42 may include one or more inlets for receiving (i) the stream 22 comprising the second catalyst and the converted hydrocarbons and (ii) the effluent stream 40 from reactor 3 including a combined stream of converted hydrocarbons and the catalyst mixture. The disengagement vessel 42 may be configured to separate and recover a first effluent 44 including converted hydrocarbons and a second effluent 46 including a mixture of spent first and second catalyst. A flow line 48 and fluidizing gas 50 may be provided for conveying the mixture of spent first and second catalyst to the regenerator.

In other embodiments, such as where an integral reactor/separation system as illustrated in FIG. 1B is used, the second catalyst may be fed to the regenerator via 75 and the converted hydrocarbons stream 26 may be combined with stream 44 in FIG. 2 for downstream processing. Such downstream processing may include, for example, separation of a naphtha, light naphtha, or gasoline fraction, which may be fed to second reactor 7 via flow line 43 for conversion along with light boiling fraction 34. In other embodiments, separation of the effluents downstream may produce a light cycle oil fraction, which may be used as a quench medium 55. Other various hydrocarbon streams recovered via downstream processing may be fed to riser reactor 3, in some embodiments.

Figure 3:
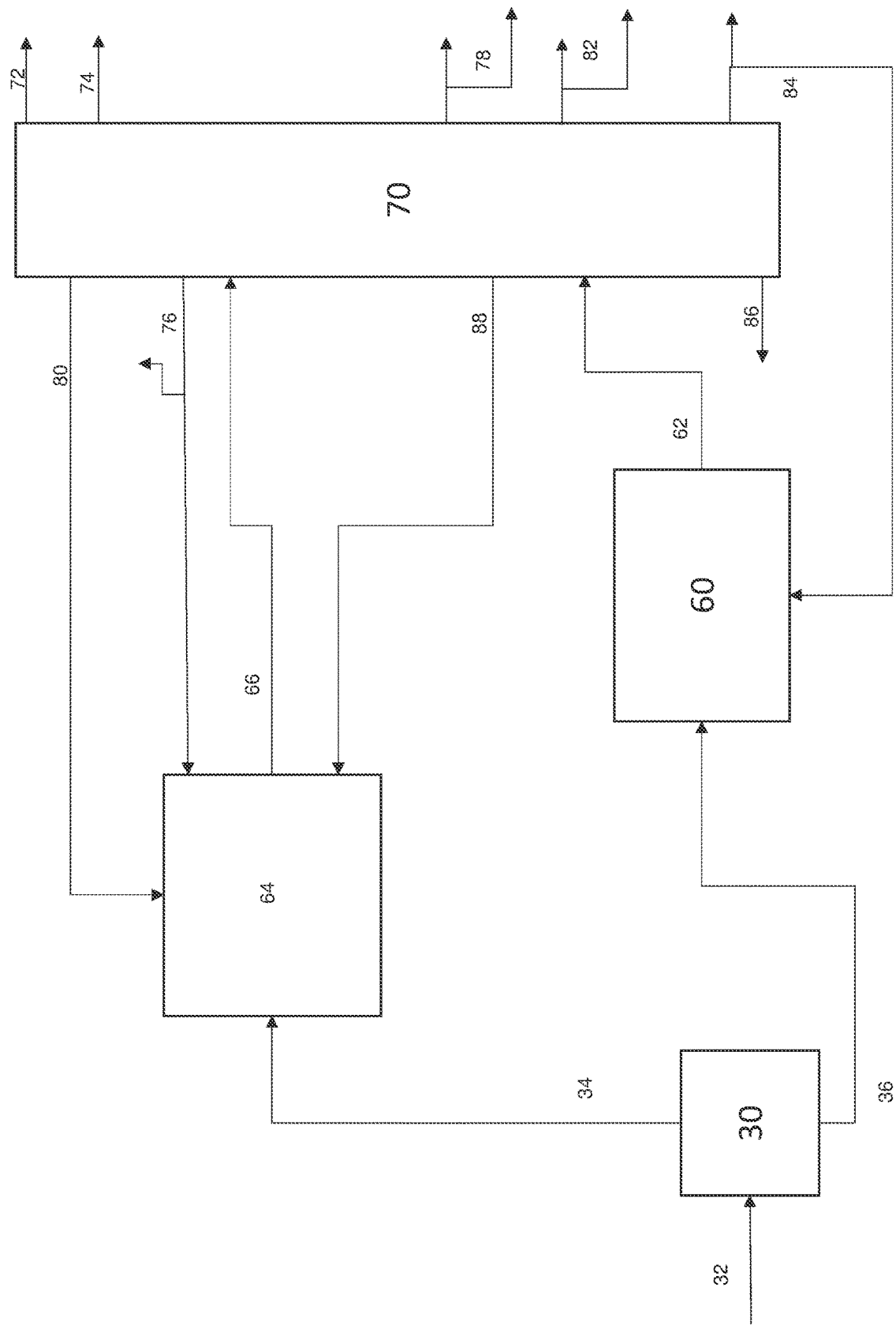
FIG. 3 is a simplified flow diagram of a process for conversion of a whole crude according to embodiments herein.

Referring now to FIG. 3, a simplified process flow diagram of a system for catalytic cracking of a whole crude according to other embodiments herein is illustrated, where like numerals represent like parts. The system for catalytic cracking of a whole crude may include a separation system 30 for separating a whole crude 32 into a light boiling fraction 34 and a heavy boiling fraction 36. In some embodiments, separating a whole crude into a light boiling fraction and a heavy boiling fraction may include separating a light boiling fraction having a 95% end boiling temperature in the range from about 300° C. to about 420° C. from the heavy boiling fraction. The actual cut point for the separations, however, may be based on the particular crude being processed.

The heavy boiling fraction 36 may be fed to a first two-reactor dual-catalyst system 60. The first two-reactor dual catalyst system 60 may include, for example, a riser reactor and a contaminant trap concentrating vessel (not illustrated). The contaminant trap concentrating vessel may be similar to that illustrated in FIG. 1A or 1B, and may be used to elevate a concentration of the metal trap within the vessel. Following reaction in the first two-reactor dual-catalyst system 60, a converted hydrocarbon effluent 62 may be recovered. In some embodiments, the catalyst in the first two-reactor dual catalyst system 60 may include a residue fluid catalytic cracking catalyst.

The light boiling fraction 34 may be fed to a second two-reactor dual-catalyst system 64. The second two-reactor dual catalyst system 64 may include a riser reactor and a secondary reactor, which may be similar to that as illustrated in FIG. 2, for example, producing a converted hydrocarbon effluent 66.

A fractionation system 70 may be provided for separating the converted hydrocarbon effluents 62, 66 from each of the first two-reactor dual catalyst system 60 and the second two-reactor dual catalyst system 64. Separation of the converted hydrocarbon fractions in the common fractionation system 70 may result in production of two, three, or more hydrocarbon fractions. In various embodiments, the two or more hydrocarbon fractions may include one or more olefin containing fractions, such as an ethylene fraction 72, a propylene fraction 74, a butenes or C4 fraction 76, as well as a C5 fraction 78, a light naphtha fraction 80, a medium or heavy naphtha fraction 82, a light cycle oil 84, a slurry oil 86, and a treated FCC feedstock 88. Treated feedstock 88 may include, for example, treated hydrocarbons from the heavy boiling fraction that would be suitable for feed to a fluid catalytic cracking system in either system 64 or any reactor described in FIG. 2. The light naphtha fraction 80 and C4s fraction 76 would also be an excellent feed which can be partly or fully recycled to a fluid catalytic cracking system in either system 64 or any reactor described in FIG. 2. The light cycle oil may be fed, as mentioned above, to one or both of reaction systems 60, 64, either as a post-reactor quench, diluent, or as a feedstock.

The second two-reactor dual-catalyst system 64 may be used to process the light boiling fraction and the treated FCC feedstock. Treated FCC feedstock 88 may be fed to the riser reactor of the second two-reactor dual-catalyst system and the light boiling fraction may be fed to the catalyst concentrating reactor. If desired, the heavy naphtha fraction 82 may be fed to the either of reactor systems 60 or 64, depending on the requirement as a feed or diluent.

In some embodiments, the medium or heavy naphtha 82 may be fed to an aromatics complex. The aromatics complex may include, for example, a reforming reactor for converting the heavy naphtha hydrocarbons into aromatic hydrocarbons and other associated equipment to convert, recover and/or separate various aromatic hydrocarbon fractions, such as benzene, toluene, and xylenes.

Catalyst systems useful in embodiments herein may include one or more cracking catalysts. In some embodiments, the catalyst systems may utilize two types of catalysts, each favoring a different type of hydrocarbon feed. The first cracking catalyst may be useful for catalytic cracking and contaminant removal from heavier hydrocarbon feedstocks, such as a metal tolerant FCC or RFCC catalyst or metals trap or other similar catalysts or bottoms cracking additives known in the art. The second cracking catalyst may be a catalyst useful for cracking $C_4$s or naphtha range hydrocarbons and selective for producing light olefins, such as a ZSM-5 or ZSM-11 type catalyst with a combination of Y-type zeolite catalyst, or other similar catalysts known in the art. To facilitate the reactor schemes and processing in some embodiments disclosed herein, the first cracking catalyst may have a first average particle size and density, and may be larger and/or denser than those for the second cracking catalyst, such that the catalysts may be separated based on density and/or size (e.g., based on terminal velocity or other characteristics of the catalyst particles). This application mainly aims at simultaneous treating the heavier hydrocarbon fraction of the crude oil and also catalytic cracking of all fractions of crude oil into light olefins and aromatics. These catalyst systems may be employed while processing sour or medium or heavy crude oils.

In other embodiments, the catalyst systems may utilize two types of catalysts, each favoring a different type of hydrocarbon feed. The first catalyst may be a catalyst useful for cracking $C_4$s or naphtha range or treated heavy hydrocarbons and selective for producing light olefins, such as a ZSM-5 or ZSM-11 type catalyst with a combination of Y-type zeolite catalyst, or other similar catalysts or additives known in the art. The second cracking catalyst may be useful for cracking heavier hydrocarbon feedstocks, such as a metal tolerant FCC or RFCC catalyst or metals trap or other similar catalysts or bottoms cracking additives known in the art. To facilitate the reactor schemes and processing in some other embodiments disclosed herein, the first cracking catalyst may have a first average particle size and density, and may be larger and/or denser than those for the second cracking catalyst, such that the catalysts may be separated based on density and/or size (e.g., based on terminal velocity or other characteristics of the catalyst particles). This application mainly aims at converting heavier hydrocarbon fraction of the crude oil into medium or lighter fractions and then maximize the catalytic cracking of all fractions of crude oil into light olefins and aromatics (for achieving the highest product yields, selectivity of these petrochemical building blocks from whole crude oil cracking).

Adsorbents or contaminant trapping additives useful in embodiments herein may include compounds and structures that have a higher affinity for the contaminants than the catalyst at conditions in the contaminant removal vessel. The contaminant may thus be preferentially absorbed or retained on the contaminant trapping additive. To facilitate the processing schemes in some embodiments disclosed herein, separation of the contaminant trapping additive from the catalyst, the contaminant trapping additive may have an average particle size greater than the catalyst(s) and/or a density greater than the catalyst(s), such that the contaminant trapping additives may be separated from one or more of the catalysts based on density and/or size.

Contaminants that may be encountered with various hydrocarbon feedstocks may include one or more of iron, copper, calcium, phosphorous, vanadium, nickel, chlorine, and sodium, among others. Such contaminants can have a detrimental effect on catalysts, such as cracking catalysts, including FCC catalysts, used for converting heavier hydrocarbons to lighter hydrocarbons. Various contaminants may poison the cracking catalyst and reduce its activity. The contaminants may also plug pores or reduce diffusivity through the catalyst pores, inhibiting the effectiveness of the catalyst or result in mechanical damage of the process equipment or higher costs.

The contaminant trapping additive, as noted above, should have a higher affinity for the contaminant than the catalyst. The particular type of contaminant trapping additive used may thus depend on the particular contaminant(s) to be targeted. Contaminant trapping additives useful in some embodiments disclosed herein may include commercially available vanadium/nickel/iron traps (additives) manufactured by FCC catalyst vendors. In some embodiments, the metals trapping additive may include a magnesium oxide and/or alumina based support having calcium, tin, cesium, or other metals promotion for effectively trapping the iron, copper, phosphorous, vanadium, nickel, sodium, calcium, chlorine, or other contaminant metals that may be contained within the hydrocarbon feedstocks. Removal of these contaminants efficiently from the FCC catalyst (mainly responsible for catalytic cracking) may minimize their detrimental effect in the riser-reactor.

In order to improve the solid separation efficiency, the contaminant trapping additive may have a larger particle size and/or a higher density than the cracking catalysts. For example, cracking catalysts, such as Y-type zeolite based FCC cracking catalysts conventionally used in commercial FCC units, may have typical particle sizes in the range from about 20 microns to about 200 microns, and may have apparent bulk density in the range from about 0.60 g/cc to about 1.1 g/cc. These catalysts/additives used in FCC and various related cracking processes according to embodiments herein may include a single type of catalyst or a mixture of catalysts. In other embodiments, these catalyst/additive properties are reversed, depending on the application, purpose and resulting process scheme described in FIGS. 1A, 1B, 2 and 3.

Contaminant trapping additives useful in embodiments herein may have a particle size larger than the cracking catalysts/additives used, such as a particle size in the range from about 20 microns to about 350 microns. Additionally, or alternatively, the contaminant trapping additives may have a bulk density greater than that of the catalysts, such as a density in the range from about 0.7 g/cc to about 1.2 g/cc.

The differences in size and/or density between the contaminant trapping additive and the catalyst may facilitate separation in the solids separator. Embodiments herein may use a classifier/separator for separating contaminant trapping additive from catalyst. This device can be attached to either the existing FCC stripper or regenerator vessels.

Hydrocarbon mixtures that may be processed according to embodiments disclosed herein may include various hydrocarbon mixtures having a boiling point range, where the end boiling point of the mixture may be greater than 500° C., such as greater than 525° C., 550° C., or 575° C. The amount of high boiling hydrocarbons, such as hydrocarbons boiling over 550° C., may be as little as 0.1 wt %, 1 wt % or 2 wt %, but can be as high as 10 wt %, 25 wt %, 50 wt % or greater. The description is explained with respect to crude oil, such as whole crude oil, but any high boiling end point hydrocarbon mixture can be used. However, processes disclosed herein can be applied to crudes, condensates and hydrocarbon with a wide boiling curve and end points higher than 500° C. Such hydrocarbon mixtures may include whole crudes, virgin crudes, hydroprocessed crudes, gas oils, vacuum gas oils, heating oils, jet fuels, diesels, kerosenes, gasolines, synthetic naphthas, raffinate reformates, Fischer-Tropsch liquids, Fischer-Tropsch gases, natural gasolines, distillates, virgin naphthas, natural gas condensates, atmospheric pipestill bottoms, vacuum pipestill streams including bottoms, wide boiling range naphtha to gas oil condensates, waste plastic derived oils, heavy non-virgin hydrocarbon streams from refineries, vacuum gas oils, heavy gas oils, atmospheric residuum, hydrocracker wax, and Fischer-Tropsch wax, among others. In some embodiments, the hydrocarbon mixture may include hydrocarbons boiling from the naphtha range or lighter to the vacuum gas oil range or heavier. When a whole crude is processed according to embodiments herein, the processes and systems herein may include a feed preparation section, which may include a desalter, for example.

Crude contains a distribution of compounds from butanes to VGO and residue (material boiling over 550° C.). The wide boiling range material, such as a whole crude, may be conditioned and processed according to embodiments herein such that a fluid catalytic crackable feed may be sent to a downstream reactor, such as a riser reactor, for conversion of the crackable feed into petrochemicals, such as ethylene, propylene, butenes, and aromatics, such as benzene, toluene, and xylenes, as well as other cracked products.

As noted above, high-boiling compounds in the crude oil may cause significant operational issues if they are sent to a fluid catalytic cracker, due to their propensity to form coke and deposit impurities on the catalysts. Therefore, the high boiling compounds are typically removed before sending the lighter fractions to a catalytic cracker or other petrochemicals units, such as the fluid catalytic cracker or an aromatics complex. The removal process increases the capital cost of the overall process and lowers profitability, as the removed high-boiling compounds can only be sold as low-value fuel oil.

The configurations of systems and processes for the conversion of whole crudes and wide boiling range hydrocarbon mixtures according to embodiments described herein may efficiently handle resid conversion while maximizing the petrochemicals conversion and maintaining lower coking propensity in the fluid catalytic cracker.

In some embodiments, the separation system used to separate the whole crude may be a hot oil processing system (HOPS), such as a two-stage HOPS, for separating the whole crude into a light fraction and a heavy fraction. In other embodiments, the separations may be performed in an integrated separation device (ISD), such as that disclosed in US20130197283, which is incorporated herein by reference, and which may separate a low boiling fraction from a higher boiling liquid fraction based on a combination of centrifugal and cyclonic effects.

As described above, systems according to embodiments herein may include both a first and a second two-reactor dual catalyst system comprises. In some embodiments, a two-reactor dual catalyst system may include a regenerator, a disengagement vessel, a riser reactor, and a catalyst concentrating reactor.

A regenerator may be provided for regenerating spent first catalyst and spent second catalyst, and may include a first outlet for conveying a mixture of regenerated first and second catalyst from the regenerator to the first reactor, as well as a second outlet for conveying a mixture of regenerated first and second catalyst to the catalyst concentrating reactor. The first catalyst has a density greater than a density of the second catalyst, a particle size larger than a particle size of the second catalyst, or both a greater density and a larger particle size than the second catalyst.

The first reactor, which may be a riser reactor, may be used for contacting the heavy boiling fraction with the mixture of regenerated first and second catalyst to convert a portion of the hydrocarbons in the heavy boiling fraction to lighter hydrocarbons. The riser reactor may include an inlet for receiving the catalyst mixture comprising regenerated first and second catalyst from the regenerator; and an outlet for conveying a mixture of converted hydrocarbons and the catalyst mixture.

The second reactor, which may be a catalyst concentrating reactor, may be a moving or fluidized bed reactor for contacting the light boiling fraction with a concentrated catalyst mixture comprising first catalyst and second catalyst. The second reactor may include an inlet for receiving the catalyst mixture comprising regenerated first and second catalyst from the regenerator, and an outlet for conveying a mixture of converted hydrocarbons, first catalyst and second catalyst to a catalyst separation system.

The catalyst separation system may be a cyclone or other vessel where solids and gases are introduced at a common inlet and through degassing, inertial and centripetal forces, the particles are separated based on size and/or density with preference to the smaller particles entraining to the vapor outlet, while the majority of the larger particles may be recovered and return to the catalyst concentrating reactor via a dense phase standpipe or dipleg. Thus, the catalyst separation system may be configured to separate the first catalyst from a mixture comprising the second catalyst and the converted hydrocarbons based on at least one of catalyst size or catalyst density, to thereby produce a first stream comprising separated first catalyst and a second stream comprising the second catalyst and the converted hydrocarbons. The catalyst concentrating reactor may include an inlet for receiving the first stream comprising the separated first catalyst thereby increasing a relative concentration of the first catalyst in the second reactor.

The disengagement vessel may have one or more inlets for receiving (i) the second stream comprising the second catalyst and the converted hydrocarbons from the particle separation system, and/or (ii) the mixture of converted hydrocarbons and the catalyst mixture from the riser reactor. The disengagement vessel may include cyclones, for example, configured to separate and recover a first effluent comprising converted hydrocarbons and a second effluent comprising a mixture of spent first and second catalyst. The disengagement vessel may also include steam or inert gas injection to fully remove or strip hydrocarbons from the catalyst particles. A flow line may then be used for conveying the mixture of stripped spent first and second catalyst to the regenerator.

The first two-reactor dual catalyst system may include a first reactor for contacting a residue fluid catalytic cracking catalyst or another catalyst suitable for converting heavier components in a high boiling portion of a whole crude. The residue fluid catalytic cracking catalyst may be contacted with a hydrocarbon feedstock to convert at least a portion of the hydrocarbon feedstock to lighter hydrocarbons.

A separator may be provided for separating the lighter hydrocarbons from spent residue fluid catalytic cracking catalyst, and a feed line may be provided for feeding separated spent cracking catalyst from the separator to a catalyst regenerator. A catalyst transfer line may be used to transfer a portion of the spent cracking catalyst from the catalyst regenerator to a contaminant removal vessel. In the contaminant removal vessel, the spent catalyst may be contacted with a contaminant trapping additive, where the contaminant trapping additive (metal trap) may have at least one of an average particle size or density greater than an average particle size or density of the residue fluid catalytic cracking catalyst. A second separator may be provided for separating an overhead stream from the contaminant removal vessel into a first stream comprising residue fluid catalytic cracking catalyst and lifting gas and a second stream comprising contaminant trapping additive. A recycle line may be provided for transferring contaminant trapping additive recovered in the second separator to the contaminant removal vessel, thereby concentrating the metal trap within the contaminant removal vessel. A bottoms product line may be provided for recovering contaminant trapping additive from the contaminant removal vessel, and another outlet may be provided for transferring the first stream, including the catalyst having a reduced contaminant level, to the catalyst regenerator.

In some embodiments, the light boiling fraction may include lighter hydrocarbons in the crude, such as butanes and other C4s, pentanes and other C5s, and naphtha, heavy naphtha, or diesel range hydrocarbons. For example, the light fraction may include hydrocarbons having a boiling point up to about 90° C. (e.g., a 90° C.-fraction), up to about 100° C., up to about 110° C., up to about 120° C., up to about 130° C., up to about 140° C., up to about 150° C., up to about 160° C., up to about 170° C., up to about 180° C., up to about 190° C., up to about 200° C., up to about 210° C., up to about 220° C., up to about 230° C., up to about 240° C., up to about 250° C. (e.g., a 250° C.-fraction), up to about 300° C., up to about 320° C., up to about 340° C., up to about 360° C., up to about 380° C., or up to about 400° C. Embodiments herein also contemplate the light cut being hydrocarbons having boiling points up to temperatures intermediate the aforementioned ranges.

Following separation of the whole crude into the desired heavy and light fractions, the fractions may then be processed in a reactor section. Reactor sections according to embodiments herein may include a dual reactor system. A first reactor may be provided for the conversion of a heavy hydrocarbon fraction, where the heavy hydrocarbon fraction may be catalytically cracked to naphtha, middle distillates and light olefins. In some embodiments, the first reactor may be a riser reactor, which is a pneumatic flow co-current type reactor (catalyst and hydrocarbons flowing through and recovered from the reactor together as an effluent).

A second reactor may be provided for the conversion of lighter hydrocarbons, such as C4 and naphtha range hydrocarbons. The second reactor may also be a riser reactor, in some embodiments. In other embodiments, the second reactor may be a catalyst concentrating reactor system, as described further below.

Reactor sections to embodiments herein may also include a dual reactor conditioning system. A first conditioning reactor may be provided for the removal of contaminants. In some embodiments, the first conditioning reactor may be a contaminant trapping additive concentrating system, as described further below. A second conditioning reactor may be provided for the partial conversion of the hydrocarbon feedstock. For example, the second conditioning reactor may convert heavy hydrocarbons contained in the whole crude to lighter hydrocarbons suitable for processing in either the first or second reactor, as described above.

Other embodiments of systems herein may include contaminant and catalyst concentrating system. The contaminant and catalyst concentrating system may include, for example, a particle separation system and a solids separation system which may include one or more separation steps to separate the catalysts and metal traps for concentration in the various reactors.

The above-described concentrating systems may be used to effectively convert whole crude in a fluid catalytic cracking system. For example, as described above with respect to FIGS. 2 and 3, a common catalyst regenerator is provided, along with a dual reactor system, including a riser reactor and a catalyst concentrating reactor system for conversion of the light boiling fraction. And, as described with respect to FIG. 3, embodiments herein may include both a dual reactor system, including a riser reactor and a catalyst concentrating reactor system, as well as a second reactor system including a common regenerator, along with a riser reactor and a contaminant trapping additive concentrating reactor system.

In yet other contemplated embodiments, the system for processing whole crude may include only a single regenerator while including each of a reactor for cracking heavier hydrocarbons, such as a riser reactor, a reactor for cracking lighter hydrocarbons, and a contaminant trapping reactor for treating and/or conditioning the hydrocarbons.

Embodiments herein may be used to process light and sweet crude oils where feed contaminants are not significant (Scenario 1). This scheme may correspond to FIG. 2 but having HOPS or equipment 30 in FIG. 3 to separate lighter and heavy hydrocarbon fractions. Heavy fractions are sent to FCC riser with second catalyst (RFCC, small concentration of ZSM-5) while lighter stream are processed in second reactor (FIG. 1B) with solid separation device 6 for concentrating ZSM-5 to produce higher yield of light olefins and aromatics. The ZSM-5 is larger and denser particle here while RFCC catalyst is smaller and lighter. The second reactor is a single reactor dual catalyst (SRDC) type for ZSM-5 concentration (FIG. 1A or 1B).

Embodiments herein may be used to process sour and heavier crude oils (i.e., having higher levels of contaminants/impurities) (Scenario 2). This scheme may correspond to FIG. 3. The scheme may include of a HOPS as equipment 30 in FIG. 3 to separate lighter and heavy hydrocarbon fractions. Heavy fractions are sent to a single reactor dual catalyst (SRDC) type reactor with contaminant removal catalysts (RFCC catalysts, metal traps, additives, etc.) in equipment/process 60. Part 1 of the scheme may just use metal trap or contaminants removal additive in conventional FCC scheme. Part 2 of the scheme may include an FCC riser to crack medium crude oil fraction (HVGO range) in the first riser with (FCC catalyst+ZSM-5 and smaller amount of metal trap). The heaviest fraction of crude oil is routed to a single reactor dual catalyst (SRDC) reactor wherein the contaminants are removed from oil and also the solid separation device will help concentrating the metal trap or contaminant removal additive. The metal trap particles are larger and denser while FCC catalyst and ZSM-5 will be identical but lighter and smaller when compared to the metal trap. This refers to a scheme with combination of FIGS. 1A and 2. Most of the lighter crude oil fractions from equipment 30 and recycle streams from fractionator 70 are processed in equipment/process 64 which is corresponding to a combination of schemes in FIG. 1A or 1B and FIG. 2. Further, the process 64 is similar to Scenario 1 with FCC/RFCC catalyst and ZSM-5 for concentrating ZSM-5 to produce higher yield of light olefins and aromatics. In process 64, the ZSM-5 is larger and denser particle here while FCC/RFCC catalyst is smaller and lighter.

While most of the lighter crude oil fractions from equipment 30 and recycle streams from fractionator 70 are processed in equipment/process 64 which is corresponding to a combination of schemes in FIG. 1A or 1B and FIG. 2. Further, the process 64 is similar to scenario 1 with FCC/RFCC catalyst and ZSM-5 for concentrating ZSM-5 to produce higher yield of light olefins and aromatics. In process 64, the ZSM-5 is larger and denser particle here while FCC/RFCC catalyst is smaller and lighter.

As described above, embodiments herein may provide a reactor system employed in FCC/RFCC unit for removing contaminants (CCR, nickel, vanadium, nitrogen, sodium, iron, calcium, etc.) from a heavy portion of the crude oil. The products may be routed to a common main fractionation section. The heavy feed with lower contaminants may then be processed in an FCC unit. The additive in this unit could be spent catalyst of an FCC unit along with metal traps. This concept employs a fluid catalytic reaction platform with carbon rejection approach.

The fresh naphtha and gas oils from crude oil separations (such as a HOPS top) along with recycled cat naphtha from the common gas plant may be recycled back to another Single Regenerator Dual Catalyst reactor system attached to the FCC unit regenerator. The additional reactor employed in the FCC/RFCC unit may be used for enhancing light olefins, high octane gasoline and aromatics production from naphtha and/or C4s processing in reactors with catalyst suitable to maximize these products. The Single Regenerator Dual Catalyst (SRDC) technology with a built-in a Solid Separation Device (SSD), in some embodiments, may be utilized to increase the concentration of an additive (such as a ZSM-5 or a metal trap) by segregating it from the FCC/RFCC catalyst in the FCCU/RFCCU system. Using the SSD, the additive concentration of 1.5-5×, such as 3-4×, increase in the overall inventory is achievable from a mix of FCC catalyst and additives (metal trap or ZSM-5 particles of higher density and larger particles compared to FCC/RFCC catalyst). Processes according to embodiments herein may thus overcome the issues noted above with respect to processing of whole crudes, achieving superior conversion of crude into light olefins, and also improved removal of feed contaminants, improving catalyst life and activity.

Embodiments herein, as described above, relate to the catalytic conversion of crude oils from various sources into light olefins with simultaneous removal of contaminants in the crude oil. Processes herein may be a standalone process, as described above. Alternatively, the contaminants removal step may be integrated or replaced with LC-Fining, LC-MAX, ARDS, or other systems suitable for handling residue or other high boiling fractions of a crude. The reactor and catalytic features of embodiments herein can be considered as a part of a high severity FCC process aiming at maximizing light olefins or crude-to-chemicals path. Lummus INDMAX FCC design/configuration provide a great alternative to incorporate the desired hardware features of embodiments herein within the scope of FCC. In addition, embodiments herein can be integrated with conventional FCC processes aiming at producing gasoline or middle distillates, such as by routing the naphtha produced from FCC to a high-density re-circulating riser as described herein for maximizing light olefins. Embodiments herein may also be integrated with Lummus Olefins Conversion Technology (OCT) for converting ethylene and butenes, among other olefins, into a high yield of propylene.

While the disclosure includes a limited number of embodiments, those skilled in the art, having benefit of this disclosure, will appreciate that other embodiments may be devised which do not depart from the scope of the present disclosure.

What is claimed as new and desired to be protected by Letters Patent is:

1. A system useful for catalytic cracking of a whole crude, the system comprising:
   a separator for separating a whole crude into a light boiling fraction and a heavy boiling fraction;
   a first two-reactor dual-catalyst system and a second two-reactor dual-catalyst system, each producing a converted hydrocarbon effluent;
   a common fractionation system for receiving the converted hydrocarbon effluent from each of the first two-reactor dual catalyst system and the second two-reactor dual catalyst system, the common fractionation system configured to separate the converted hydrocarbon fractions into two or more hydrocarbon fractions including one or more olefin containing fractions and a treated fluid catalytic cracking feedstock;

the first two-reactor dual-catalyst system, wherein the first two-reactor dual-catalyst system is configured for contacting the heavy boiling fraction with a residue fluid catalytic cracking catalyst and for contacting contaminated residue fluid catalytic cracking catalyst with a metal trap; and the second two-reactor dual-catalyst system, wherein the second two-reactor dual catalyst comprises:

a first reactor for contacting the treated fluid catalytic cracking feedstock with a mixed catalyst system comprising a first catalyst and a second catalyst;

a second reactor for contacting the light boiling fraction with a mixed catalyst system comprising the first catalyst and the second catalyst, wherein the first catalyst is at a higher relative concentration in the second reactor compared to the first reactor; and a catalyst disengagement vessel configured to receive and separate an effluent from each of the first and second reactors into a spent catalyst mixture and the converted hydrocarbon effluent from the second two-reactor dual catalyst system fed to the common fractionation system.

2. The system of claim 1, wherein the separator for separating a whole crude into a light boiling fraction and a heavy boiling fraction is configured to separate a light boiling fraction having a 95% end boiling temperature in the range from about 300° C. to about 420° C. from the heavy boiling fraction.

3. The system of claim 1, wherein the second two-reactor dual catalyst system comprises:

a regenerator for regenerating spent first catalyst and spent second catalyst, and including a first outlet for conveying a mixture of regenerated first and second catalyst and a second outlet for conveying a mixture of regenerated first and second catalyst;

the first reactor, wherein the first reactor is a riser reactor for contacting the heavy boiling fraction with the mixture of regenerated first and second catalyst, wherein the first catalyst has a density greater than a density of the second catalyst, a particle size larger than a particle size of the second catalyst, or both a greater density and a larger particle size than the second catalyst, the riser reactor having:

an inlet for receiving the catalyst mixture comprising regenerated first and second catalyst from the regenerator; and an outlet for conveying a mixture of converted hydrocarbons and the catalyst mixture;

the second reactor, wherein the second reactor is a moving or fluidized bed reactor for contacting the light boiling fraction with a concentrated catalyst mixture comprising first catalyst and second catalyst, the second reactor having:

an inlet for receiving the catalyst mixture comprising regenerated first and second catalyst from the regenerator;

an outlet for conveying a mixture of converted hydrocarbons, first catalyst and second catalyst to a catalyst separation system, the catalyst separation system configured to:

separate the first catalyst from a mixture comprising the second catalyst and the converted hydrocarbons based on at least one of catalyst size or catalyst density;

produce a first stream comprising separated first catalyst and a second stream comprising the second catalyst and the converted hydrocarbons; and an inlet for receiving the first stream comprising the separated first catalyst thereby increasing a relative concentration of the first catalyst in the second reactor;

a disengagement vessel having one or more inlets for receiving (i) the second stream comprising the second catalyst and the converted hydrocarbons and (ii) the mixture of converted hydrocarbons and the catalyst mixture, the disengagement vessel configured to separate and recover a first effluent comprising converted hydrocarbons and a second effluent comprising a mixture of spent first and second catalyst; and a flow line for conveying the mixture of spent first and second catalyst to the regenerator.

4. The system of claim 1, wherein the first two-reactor dual catalyst system comprises:

a first reactor for contacting the residue fluid catalytic cracking catalyst with a heavier boiling fraction hydrocarbon feedstock to convert at least a portion of the hydrocarbon feedstock to lighter hydrocarbons;

a separator for separating hydrocarbon product vapors, including the lighter hydrocarbons, from spent residue fluid catalytic cracking catalyst;

a feed line for feeding separated spent cracking catalyst from the separator to a catalyst regenerator;

a catalyst transfer line for transferring a portion of the spent cracking catalyst from the catalyst regenerator to a contaminant removal vessel;

the contaminant removal vessel, for contacting the spent catalyst with a contaminant trapping additive having at least one of an average particle size or density greater than an average particle size or density of the residue fluid catalytic cracking catalyst;

a second separator for separating an overhead stream from the contaminant removal vessel into a first stream comprising residue fluid catalytic cracking catalyst and lifting gas and a second stream comprising contaminant trapping additive;

a recycle line for transferring contaminant trapping additive recovered in the second separator to the contaminant removal vessel;

a bottoms product line for recovering contaminant trapping additive from the contaminant removal vessel; and a line for transferring the first stream to the catalyst regenerator.

5. The system of claim 1, wherein the separator for separating the whole crude comprises a hot oil processing system.

6. The system of claim 1, wherein the common fractionation system is configured to separate the converted hydrocarbon fractions into three or more hydrocarbon fractions, the three or more hydrocarbon fractions including the one or more olefin fractions, the treated fluid catalytic cracking feedstock, and one or more of a C5 fraction, a FCC naphtha fraction, a heavy naphtha fraction, a light cycle oil fraction, or a slurry oil fraction.

7. The system of claim 6, further comprising a flow line for feeding the FCC naphtha fraction to the second reactor.

8. The system of claim 6, further comprising an olefins conversion unit for receiving at least one of the C4 fraction and the C5 fraction and for converting at least one of olefins or paraffins therein to at least one of ethylene or propylene.

9. The system of claim 6, further comprising an aromatics complex configured to reform the heavy naphtha fraction and to recover one or more aromatics product streams.

10. The system of claim 1, further comprising a second separator for separating the heavy boiling fraction into a medium boiling fraction and a residue fraction, wherein the residue fraction is fed as the heavy boiling fraction to the first two-reactor dual catalyst system, and wherein the medium boiling fraction is fed to the first reactor of the second two-reactor dual-catalyst system.

11. A process for catalytic cracking of a whole crude, the process comprising:
   separating a whole crude into a light boiling fraction and a heavy boiling fraction;
   converting the heavy boiling fraction in a first two-reactor dual-catalyst system and recovering a converted hydrocarbon effluent;
   converting the light boiling fraction in a second two-reactor dual-catalyst system and recovering a converted hydrocarbon effluent;
   separating the converted hydrocarbon effluent from each of the first two-reactor dual catalyst system and the second two-reactor dual catalyst system in a common fractionation system configured to separate the converted hydrocarbon fractions into two or more hydrocarbon fractions including one or more olefin containing fractions and a treated fluid catalytic cracking feedstock;
   wherein the converting the heavy boiling fraction in a first two-reactor dual-catalyst system comprises contacting the heavy boiling fraction with a residue fluid catalytic cracking catalyst and contacting contaminated residue fluid catalytic cracking catalyst with a metal trap; and
   wherein converting the light boiling fraction in a second two-reactor dual-catalyst system comprises:
      contacting the treated fluid catalytic cracking feedstock with a mixed catalyst system comprising a first catalyst and a second catalyst in a first reactor;
      contacting the light boiling fraction with a mixed catalyst system comprising the first catalyst and the second catalyst in a second reactor, wherein the first catalyst is at a higher relative concentration in the second reactor compared to the first reactor; and
      separate an effluent from each of the first and second reactors into a spent catalyst mixture and the converted hydrocarbon effluent from the second two-reactor dual-catalyst system fed to the common fractionation system.

12. The process of claim 11, wherein the separating a whole crude into a light boiling fraction and a heavy boiling fraction comprises separating a light boiling fraction having a 95% end boiling temperature in the range from about 300° C. to about 420° C. from the heavy boiling fraction.

13. The process of claim 11, wherein the second two-reactor dual catalyst system comprises:
   a regenerator for regenerating spent first catalyst and spent second catalyst, and including a first outlet for conveying a mixture of regenerated first and second catalyst and a second outlet for conveying a mixture of regenerated first and second catalyst;
   the first reactor, wherein the first reactor is a riser reactor for contacting the heavy boiling fraction with the mixture of regenerated first and second catalyst, wherein the first catalyst has a density greater than a density of the second catalyst, a particle size larger than a particle size of the second catalyst, or both a greater density and a larger particle size than the second catalyst, the riser reactor having:
      an inlet for receiving the catalyst mixture comprising regenerated first and second catalyst from the regenerator; and
      an outlet for conveying a mixture of converted hydrocarbons and the catalyst mixture;
   the second reactor, wherein the second reactor is a moving or fluidized bed reactor for contacting the light boiling fraction with a concentrated catalyst mixture comprising first catalyst and second catalyst, the second reactor having:
      an inlet for receiving the catalyst mixture comprising regenerated first and second catalyst from the regenerator;
      an outlet for conveying a mixture of converted hydrocarbons, first catalyst and second catalyst to a catalyst separation system, the catalyst separation system configured to:
         separate the first catalyst from a mixture comprising the second catalyst and the converted hydrocarbons based on at least one of catalyst size or catalyst density;
         produce a first stream comprising separated first catalyst and a second stream comprising the second catalyst and the converted hydrocarbons; and
      an inlet for receiving the first stream comprising the separated first catalyst thereby increasing a relative concentration of the first catalyst in the second reactor;
   a disengagement vessel having one or more inlets for receiving (i) the second stream comprising the second catalyst and the converted hydrocarbons and (ii) the mixture of converted hydrocarbons and the catalyst mixture, the disengagement vessel configured to separate and recover a first effluent comprising converted hydrocarbons and a second effluent comprising a mixture of spent first and second catalyst; and
   a flow line for conveying the mixture of spent first and second catalyst to the regenerator.

14. The process of claim 11, wherein the first two-reactor dual catalyst system comprises:
   a first reactor for contacting the residue fluid catalytic cracking catalyst with a hydrocarbon feedstock to convert at least a portion of the hydrocarbon feedstock to lighter hydrocarbons;
   a separator for separating the lighter hydrocarbons from spent residue fluid catalytic cracking catalyst;
   a feed line for feeding separated spent cracking catalyst from the separator to a catalyst regenerator;
   a catalyst transfer line for transferring a portion of the spent cracking catalyst from the catalyst regenerator to a contaminant removal vessel;
   the contaminant removal vessel, for contacting the spent catalyst with a contaminant trapping additive having at least one of an average particle size or density greater than an average particle size or density of the residue fluid catalytic cracking catalyst;
   a second separator for separating an overhead stream from the contaminant removal vessel into a first stream comprising residue fluid catalytic cracking catalyst and lifting gas and a second stream comprising contaminant trapping additive;
   a recycle line for transferring contaminant trapping additive recovered in the second separator to the contaminant removal vessel;

a bottoms product line for recovering contaminant trapping additive from the contaminant removal vessel; and a line for transferring the first stream to the catalyst regenerator.

15. The process of claim 11, wherein the common fractionation system separates the converted hydrocarbon fractions into three or more hydrocarbon fractions, the three or more hydrocarbon fractions including the one or more olefin fractions, the treated fluid catalytic cracking feedstock, and one or more of a C4 fraction, a C5 fraction, a FCC naphtha fraction, a heavy naphtha fraction, a light cycle oil fraction, or a slurry oil fraction.

16. The process of claim 15, further comprising feeding the C4 fraction and the FCC naphtha fraction to the second reactor, wherein the FCC naphtha fraction comprises one or more of a light naphtha fraction, a medium naphtha fraction, a heavy naphtha fraction, or a full range naphtha fraction.

17. The process of claim 15, further comprising feeding light cycle oil (LCO) or treated hydrocarbon liquid or slurry oil to either first or second reactor systems as a recycle feed or diluent.

18. The process of claim 15, further comprising feeding at least one of the C4 fraction and the C5 fraction to an olefins conversion unit and converting at least one of olefins or paraffins therein to at least one of ethylene or propylene.

19. The process of claim 15, further comprising feeding the medium or heavy naphtha fraction to an aromatics complex to reform the medium or heavy naphtha fraction and to recover one or more aromatics product streams.

20. The process of claim 11, further comprising separating the heavy boiling fraction into a medium boiling fraction and a residue fraction, wherein the residue fraction is fed as the heavy boiling fraction to the first two-reactor dual catalyst system, and wherein the medium boiling fraction is fed to the first reactor of the second two-reactor dual-catalyst system.

21. A system useful for catalytic cracking of a whole crude, the system comprising:
a separator for separating a whole crude into a light boiling fraction and a heavy boiling fraction;
a regenerator for regenerating spent first catalyst and spent second catalyst, and including a first outlet for conveying a mixture of regenerated first and second catalyst and a second outlet for conveying a mixture of regenerated first and second catalyst;
a riser reactor for contacting the heavy boiling fraction with a catalyst mixture, wherein the catalyst mixture comprises a first catalyst and a second catalyst, and wherein the first catalyst has a density greater than a density of the second catalyst, a particle size larger than a particle size of the second catalyst, or both a greater density and a larger particle size than the second catalyst, the riser reactor having:
an inlet for receiving the catalyst mixture comprising regenerated first and second catalyst from the regenerator; and
an outlet for conveying a mixture of converted hydrocarbons and the catalyst mixture;
a second reactor for contacting the light boiling fraction with a concentrated catalyst mixture comprising first catalyst and second catalyst, the second reactor having:
an inlet for receiving the catalyst mixture comprising regenerated first and second catalyst from the regenerator;
an outlet for conveying a mixture of converted hydrocarbons, first catalyst and second catalyst to a catalyst separation system, the catalyst separation system configured to:
separate the first catalyst from a mixture comprising the second catalyst and the converted hydrocarbons based on at least one of catalyst size or catalyst density, producing a first stream comprising separated first catalyst and a second stream comprising the second catalyst and the converted hydrocarbons;
an inlet for receiving the first stream comprising the separated first catalyst and for increasing a concentration of the first catalyst in the second reactor;
a disengagement vessel having one or more inlets for receiving (i) the second stream comprising the second catalyst and the converted hydrocarbons and (ii) the mixture of converted hydrocarbons and the catalyst mixture, the disengagement vessel configured to separate and recover a first effluent comprising converted hydrocarbons and a second effluent comprising a mixture of spent first and second catalyst; and
a flow line for conveying the mixture of spent first and second catalyst to the regenerator; and
wherein:
the system further comprises a fractionation system configured to receive the first effluent and to separate the converted hydrocarbons into three or more hydrocarbon fractions including a light hydrocarbon fraction, a naphtha fraction and a heavy fraction, and the fractionation system is further configured to recover a C5 fraction, the system further comprising an olefins conversion unit for converting olefins in the C5 fraction to at least one of ethylene or propylene, or
the fractionation system is further configured to recover a heavy naphtha fraction, the system further comprising an aromatics complex configured to reform the heavy naphtha fraction and recover one or more aromatics product streams.

22. The system of claim 21, wherein the separator comprises a hot oil processing system.

23. The system of claim 21, further comprising a flow line for feeding C4s and/or the naphtha fraction to the second reactor.

24. The system of claim 21, further comprising a flow line for feeding light cycle oil (LCO) or treated hydrocarbon liquid or slurry oil to either first or second reactor systems as a recycle feed or diluent.

25. The system of claim 21, further comprising a flow line for feeding the heavy fraction to the riser reactor.

26. The system of claim 22, wherein the separator for separating a whole crude into a light boiling fraction and a heavy boiling fraction is configured to separate a light boiling fraction having a 95% end boiling temperature in the range from about 300° C. to about 420° C.

* * * * *